Figure 1:
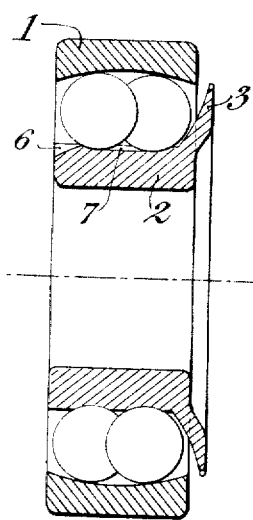

E. DELMAR.
SELF ADJUSTING BALL BEARING.
APPLICATION FILED DEC. 26, 1918.

1,308,522.

Patented July 1, 1919.

INVENTOR:
Evald Delmar,
BY
Fraser, Jurk & Myers
ATTORNEYS.

UNITED STATES PATENT OFFICE.

EVALD DELMAR, OF STOCKHOLM, SWEDEN.

SELF-ADJUSTING BALL-BEARING.

1,308,522.         Specification of Letters Patent.     Patented July 1, 1919.

Application filed December 26, 1918. Serial No. 268,367.

*To all whom it may concern:*

Be it known that I, EVALD DELMAR, a citizen of the Kingdom of Sweden, residing at Stockholm, Sweden, have invented new and useful Improvements in Self-Adjusting Ball-Bearings, of which the following is a specification.

This invention relates to self-adjusting ball-bearings and more particularly to ball-bearings of this type having two rows of balls, a spherical outer ball-race and ball-races formed in the inner ring.

It has been proposed to so construct such ball-bearings that the swinging movement of the rings in relation to each other be limited to such an extent that the inner ring is unable to swing out of the plane of the outer ring through an angle necessary for the insertion of the balls in the bearing. The purpose of such construction, in which the spherical ball-race is provided, between the rows of balls or outside one or both of them, with an annular projection limiting the axial movement of the balls, is to render it possible to omit the usual ball-cage or to replace it by a ball-cage of the simplest possible construction. This arrangement entails, however, several inconveniences, since in this case the production of the spherical outer ball-race is connected with difficulties. If the projection between the rows of balls be formed by a ring inserted in a groove cut in the outer ball-race, the difficulties in producing said ball-race may, it is true, be obviated, but instead thereof the cutting of the groove and the rolling in of the ring involve additional work.

The object of this invention is to obviate said inconveniences by providing the inner ring, at the one side, with a flange whose radius from the spherical center of the bearing is greater than the radius of the spherical raceway, the flange being situated at such a distance from said edge that the inner ring is capable of performing the swinging movement necessary for the self adjustment but, on the other hand, is prevented from swinging so far out of the plane of the outer ring that the balls may be removed or inserted. For the insertion of the balls one or more fill openings of known construction are formed in the inner ring. In this case, the outer ring may be provided with an uninterrupted ball-race just as in the well known Wingquist bearing. If the fill opening be formed in the side only of this ring opposite the flange and in the projection between the ball-races, the said flange equalizes the reduction of the cross-sectional area of the ring and the corresponding weakening of the same caused by the fill opening.

The invention is illustrated in the accompanying drawing in which—

Figure 2:
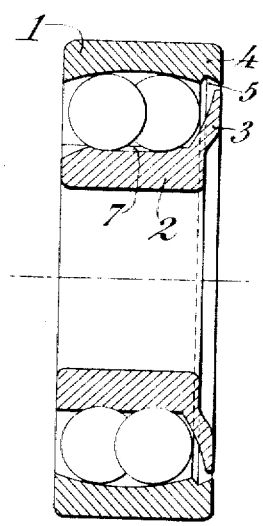
Figure 3:
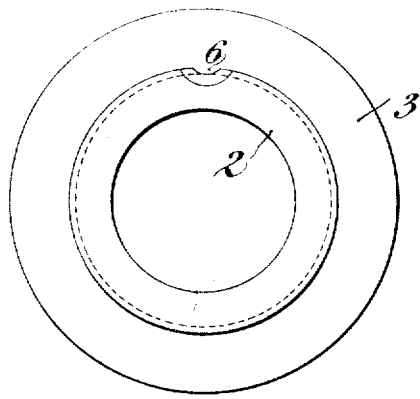

Figure 1 shows in axial section one embodiment of the invention and Fig. 2 likewise in axial section another embodiment thereof. Fig. 3 is an end view of the inner ring.

Referring to the drawing, 1 is an outer track-ring of known construction having an uninterrupted spherical ball-race. The inner ring 2 is in well-known manner provided with two ball-races and, according to the invention at the one side, with a flange 3. The radius of said flange from the spherical center of the bearing is greater than the radius of the spherical raceway, thus limiting the swinging movement of the inner ring out of the plane of the outer ring, but not preventing the swinging movement of said ring necessary for the self-adjustment of the bearing. As shown in Fig. 1, the flange 3 extends in axial direction outside the outer ring. This is not the case in Fig. 2 in which the outer ring is formed with an axial extension 14 provided with a recess 5 inclosing the flange 3 of the inner ring. Of course, a similar recess may, if there is sufficient space, be made in the one edge of the spherical outer ball-race in which case the axial extension 4 shown in Fig. 2 is omitted in part or altogether. In this case the axial extension of the inner ring is correspondingly decreased.

For the insertion of the balls the edge of the inner ring opposite the flange 3 is provided with a fill opening 6 of known construction, and the projection between the rows of balls is formed with a recess 7 making the insertion of the balls in the ball-race adjacent to the flange 3 possible. The fill opening 6 and the recess 7 may be of such dimensions that the balls may be inserted under pressure or not.

On mounting the bearing, the balls are first introduced in the row of balls adjacent to the flange 3; then, if desired, a ball-cage consisting for instance of a folded sheet-iron strip, a bent wire or the like is inserted, and finally the balls of the other row are mounted.

Having now particularly described and ascertained the nature of my said invention and in what manner the same is to be performed, I declare that what I claim is:—

1. In a ball bearing, the combination of an outer track-ring having an uninterrupted spherical ball-race, an inner track-ring and balls inserted between said rings, the inner ring having a flange formed at the one end thereof extending in radial direction toward the nearest edge of the outer ring, and a filling opening for the balls formed therein, substantially as and for the purpose set forth.

2. In a ball bearing, the combination of an outer track-ring having an uninterrupted spherical ball-race, an inner track-ring having two ball-races and formed, at the one end, with a flange extending radially toward the nearest edge of the outer ring, and two rows of balls between said rings, the inner ring being formed with a filling opening, substantially as and for the purpose set forth.

3. In a ball bearing, the combination of an outer track-ring having an uninterrupted spherical ball-race, an inner track-ring having two ball-races, and two rows of balls inserted between said rings, the inner ring being formed, at the one end, with an annular flange extending radially toward the nearest edge of the spherical ball-race at a distance therefrom sufficient for the self-adjusting movement of the inner ring, but preventing movement of the same allowing the balls to be removed from the bearing, a filling opening for the balls being formed in the inner ring.

4. A ball bearing comprising the combination of inner and outer rings with balls therebetween, said outer ring having a spherical raceway, and the inner ring having a grooved raceway and a filling notch communicating therewith, the inner ring being provided at one end with a flange whose radius from the spherical center of the bearing is greater than the radius of the spherical raceway.

5. A ball bearing comprising an integral inner ring and an integral outer ring with balls therebetween, the outer ring having a spherical raceway, and the inner ring having a grooved raceway, and an integral flange on the inner ring extending toward the outer ring for uniting the parts of the structure into a self-contained handling unit and acting to prevent accidental displacement of the balls.

6. A ball bearing comprising inner and outer rings with balls therebetween, the outer ring having a spherical raceway, and the inner ring having a grooved raceway, an integral flange on the inner ring extending toward the outer ring and acting to prevent accidental removal of the balls, the rings being formed for permitting the insertion and removal of the balls.

In testimony whereof I have signed my name.

EVALD DELMAR.